W. W. KNOWLES.

Shaft-Irons for Carriages.

No. 138,753. Patented May 13, 1873.

UNITED STATES PATENT OFFICE.

WILSON W. KNOWLES, OF PLANTSVILLE, CONNECTICUT, ASSIGNOR TO ATWATER MANUFACTURING COMPANY, OF SAME PLACE.

IMPROVEMENT IN SHAFT-IRONS FOR CARRIAGES.

Specification forming part of Letters Patent No. 138,753, dated May 13, 1873; application filed March 1, 1873.

*To all whom it may concern:*

Be it known that I, WILSON W. KNOWLES, of Plantsville, in the county of Hartford and State of Connecticut, have invented certain Improvements in Shaft-Irons for Carriages, of which the following is a specification:

My invention consists of the new article of manufacture, to wit: A T-shaped flat shaft-iron made from a single piece of wrought metal, as hereinafter described.

Figure 1:
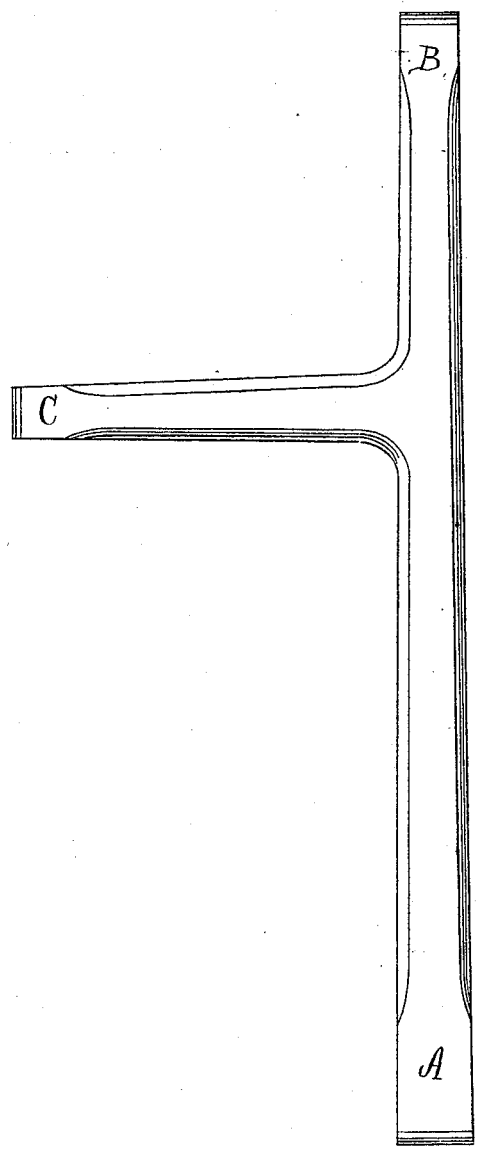
Figure 2:
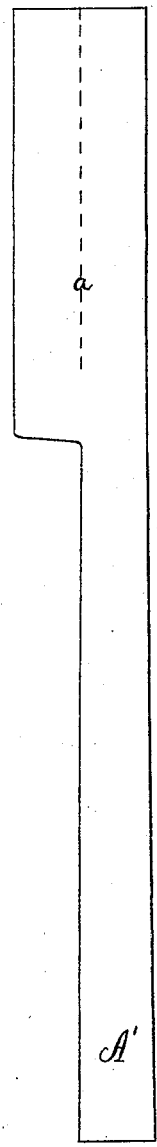

In the accompanying drawing, Figure 1 is a plan view of a shaft-iron which embodies my invention; and Fig. 2 is a plan view, showing the manner of forming the same.

This shaft-iron is designed to be secured upon carriage-shafts for the purpose of strengthening them at the junction of the cross-bar and shafts in the ordinary manner. The ordinary irons for this purpose are made of two pieces and welded together at the junction of the three arms; and, as they are subject to constant and severe strain, such welded irons are very liable to become fractured. These irons have generally been made by the different carriage-makers for themselves when they were ironing or about to iron a carriage. To make a much stronger and better article, and also to supply carriage-manufacturers with an article ready for use by them, is the object of my invention.

The long arm A is designed to be welded by the carriage-maker to the stump of the shackle-eye. The arms A B are to be secured to the shaft, and the arm C to the cross-bar. If desired, the carriage-maker may flatten or draw either of the arms, or weld other irons to the ends thereof.

In order to enable those skilled in the art to make my improved article, I will describe its construction.

I take a flat bar of Norway iron, of a width equal to about twice the width of either arm, and, by a power-hammer or other suitable means, draw out at one end of the bar an arm, A', Fig. 2, of about the same size and general form as the arm A. I then cut off the end of the bar so drawn, leaving it long enough to form the arms A and B, as shown in Fig. 2. The wide portion of the blank thus cut off is slit on the broken line $a$, and the portion of metal at the left of said line is bent out at right angles to the remaining portion of the blank. I then place this blank over a die in which is sunk an impression of the form desired for the finished iron, and force the blank into said die by means a flat-faced drop or hammer. The iron is then removed from the die, and the surplus metal or "fin," as it is called, is trimmed off, when the article is complete.

I am aware that cross-irons of T-shape, the same having flanges to inclose the thill-ends and the cross-bar, the iron also extending back to form the thill-eyes, are old. This construction forms a solid extension for the thills, and such features I disclaim; but

What I claim, and desire to secure by Letters Patent, is—

As an article of manufacture, the T-shaped shaft-corner iron A B C, its under side being flat, the same being formed solid at the junction of the arms by cutting from a single piece of wrought metal, substantially as specified.

WILSON W. KNOWLES,
*Assignor to Atwater Manfg. Co.*

Witnesses:
R. W. SCARF,
H. C. YOUNG.